United States Patent [19]

Morgan et al.

[11] 4,279,332
[45] Jul. 21, 1981

[54] MANUAL RELEASE MECHANISM FOR SPRING-APPLIED PARKING BRAKE

[75] Inventors: Glenn Morgan, Brentwood; Robert B. Morris, North Huntingdon, both of Pa.

[73] Assignee: American Standard Inc., Wilmerding, Pa.

[21] Appl. No.: 80,593

[22] Filed: Oct. 1, 1979

[51] Int. Cl.³ ............................................. F16D 65/24
[52] U.S. Cl. ........................................ 188/170; 92/63; 92/29; 188/216
[58] Field of Search ................. 188/170, 72.3, 216; 303/71; 92/63, 64, 29

[56] References Cited

U.S. PATENT DOCUMENTS

| | | | |
|---|---|---|---|
| 3,791,492 | 2/1974 | Neilsen | 188/170 |
| 3,895,695 | 7/1975 | Hunter | 188/170 |
| 3,994,205 | 11/1976 | Ekdahl et al. | 188/170 X |
| 4,036,111 | 7/1977 | Dahlkvist et al. | 188/170 X |

Primary Examiner—Douglas C. Butler
Attorney, Agent, or Firm—G. J. Falce

[57] ABSTRACT

A spring-applied, air-released parking brake, having a manual release mechanism with an automatic reset feature. To release a spring-applied parking brake, in the absence of air, a torsion bolt having a cam member formed on it is manually rotated to a position aligning the cam with an elongated slot in the piston push rod of the parking brake cylinder. This allows the piston to be extended in a direction to extend the spring, thus relieving the spring force. Reapplication of air pressure moves the piston push rod out of the elongated slot to permit angular rotation of the bolt by its torsion spring, so as to prevent its entry in the elongated slot until the bolt is again rotated manually.

10 Claims, 6 Drawing Figures

MANUAL RELEASE MECHANISM FOR SPRING-APPLIED PARKING BRAKE

BACKGROUND OF THE INVENTION

The present invention is related to spring-applied, air-released-type parking brakes and provides a manual release mechanism to permit retracting a "locked up" or "stuck" brake under conditions where there is no air available to release the brakes in the normal manner.

SUMMARY OF THE INVENTION

The object of the present invention is to provide a manual release mechanism for a spring-applied, air-released parking brake device that is arranged to automatically reset when air is reapplied to the car and the parking brake.

DESCRIPTION AND OPERATION

Figure 1:
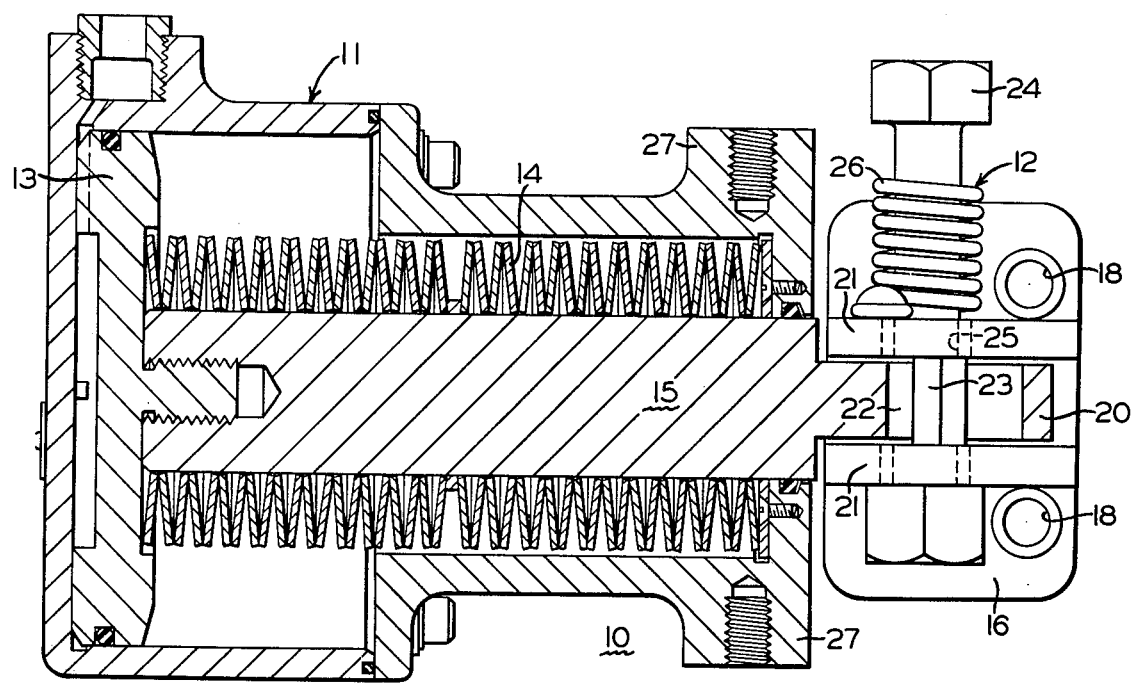
FIG. 1 of the drawings is a sectional front elevation view of the parking brake device and manual release mechanism.

The parking brake device 10 includes a pneumatic cylinder 11 and a manual release mechanism 12. A piston 13 is arranged to operate in cylinder 11 under the influence of air acting on one side and a spring pack 14 acting on the opposite side of the piston. Spring pack 14 consists of a plurality of individual disc-type springs that force piston 13 in a brake application direction, when air on the other side of the piston is reduced below approximately 60 psi. Air pressure in excess of 60 psi. fully compresses springs 14.

Figure 2:
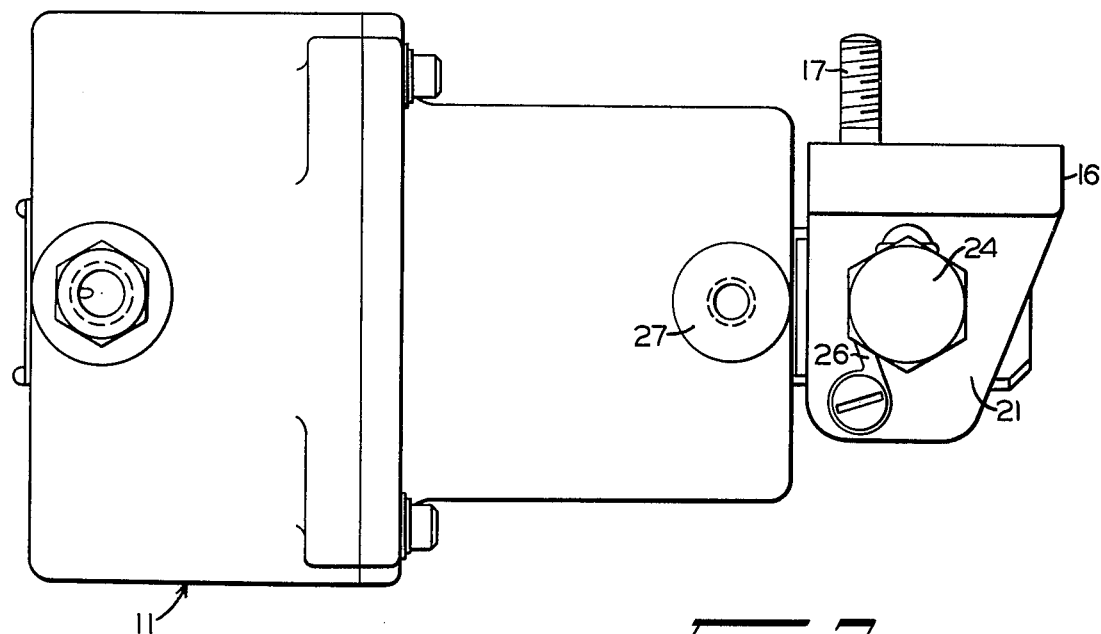
FIG. 2 of the drawings is a sectional top view of the device of FIG. 1.
Figure 3:
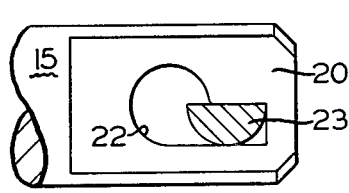
FIG. 3 of the drawings is a sectional side elevation view of the device of FIG. 1.
Figure 4:
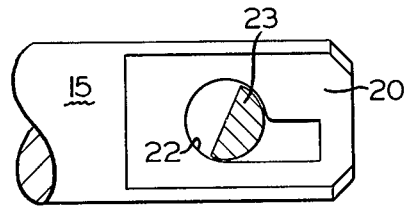
FIGS. 4 and 5 of the drawings are fragmentary views showing the structure providing the parking brake release and reset capability.

Carried on the projecting end of a rod 15 of piston 13 is a bracket 16, that is provided with a screw-threaded stud 17 (FIG. 2) and holes 18 for mounting to a disc brake actuator 19, for example. A flat end section 20 of piston rod 15 fits between a pair of spaced-apart arms 21 that projects from the face of bracket 16. End section 20 includes an opening 22 that is generally cylindrical with an offset rectangular slot, as shown in FIGS. 3 and 4, representing the "release" and "application" positions of a cam member 23. This cam member 23 is in the shape of a half-moon and is formed on a torsion bolt 24 that passes through bushed holes 25 in bracket arms 21 so as to be rotatable. A torsion spring 26 surrounds the shank end of bolt 24 to permit yielding resistance to bolt rotation.

Trunnions 27 are formed on parking brake cylinder 11 to receive a parking brake lever 28 at one end that is connected at its other end to the push rod 29 of disc brake actuator 19, and is connected intermediate its ends to a fulcrum on bracket 16.

Figure 6:
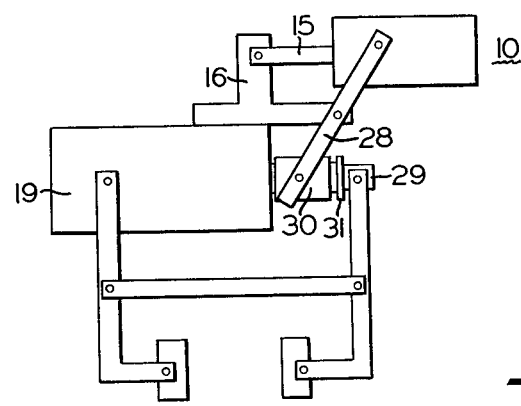
FIG. 6 of the drawings is a diagrammatic view of the parking brake device arranged with a conventional disc brake mechanism.

During normal operation, air pressure in excess of a predetermined value, e.g., 60 psi., is carried in the trainline and is effective on the face of piston 13, thereby compressing springs 14 and shifting parking brake cylinder 11 in a rightward direction, as viewed in FIG. 6, since piston rod 15 and bracket 16 are immovable relative to disc brake actuator 19.

In the rightward-most position of parking brake cylinder 11, as shown in FIG. 6, a sleeve 30 on the disc brake actuator push rod 29 is moved to a leftward-most position by parking brake lever 28, it being noted that push rod 29 is free to move in a brake application direction relative to sleeve 30. When brake pressure is thus applied to the disc brake actuator 19, the brake tongs will be operated in the usual manner to apply the brakes, without effecting movement of parking brake lever 28.

The parking brake is automatically set any time air is released below the 60 psi. value necessary to maintain springs 14 compressed. As the force of springs 14 becomes effective with loss of air, parking brake cylinder 11 is shifted in a leftward direction, thereby causing lever 28 to rotate in a counterclockwise direction about its fulcrum point on bracket 16. Sleeve 30, which is connected to the end of lever 28, as shown in FIG. 6, engages a flange 31 formed on push rod 29 to effect spreading of the brake tongs in a brake application direction. When the air pressure is completely exhausted, springs 14 are fully effective to produce parking brake forces according to the selected ratio of lever 28.

Figure 5:
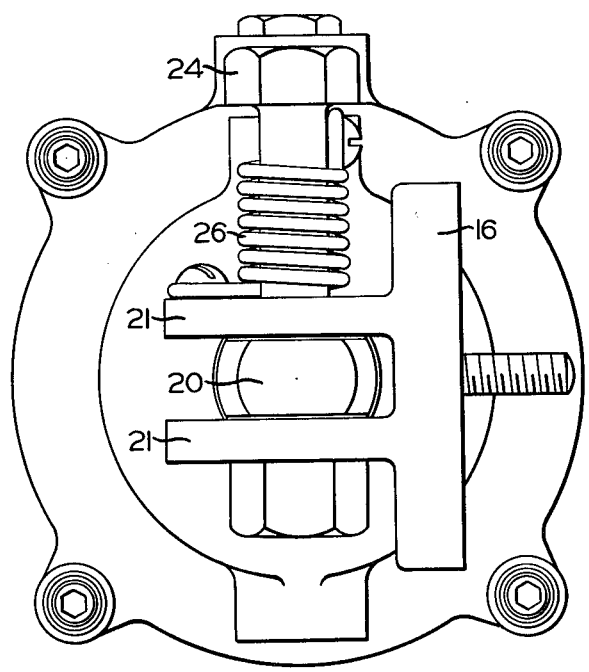

During the foregoing operations, it will be understood that cam member 23 of torsion bolt 24 is in its normal position, as shown in FIG. 5, wherein cam member 23 is angularly disposed in opening 22 so as to prevent entry in the offset rectangular slot.

In order to obtain a release of the parking brake application without air, as is often necessitated in the field, torsion bolt 24 is simply turned in a clockwise direction against the force of its spring 26, using a standard-type wrench. When this rotation is sufficient to align cam member 23 with the offset rectangular slot of opening 22, as shown in FIG. 4, piston rod 15 is shifted axially relative to bracket 16 by springs 14. This axial movement is sufficient to allow piston 13 to engage the head of cylinder 11, thereby caging springs 14 to completely relieve the spring-applied parking brake force. With the parking brake spring load relieved, the brakes are manually retracted by the return spring in the disc brake actuator (not shown).

This parking brake release mechanism automatically resets when air pressure in excess of 60 psi. is subsequently restored. When this occurs, the piston rod 15 is forced back in a direction allowing cam member 23 to slide out of the offset rectangular slot of opening 22, so that the stored torsion force of spring 26 acting on bolt 24 can effect rotation of bolt 24 back to its normal position, as shown in FIG. 5. In this position, the parking brake is set to reapply when air pressure is again reduced below 60 psi.

Having now described the invention, what we claim as new and desire to secure by Letters Patent, is:

1. A spring-applied, fluid pressure released parking brake device for a fluid pressure actuated brake mechanism having first and second relatively movable brake members, said parking brake device comprising:
  (a) a parking brake cylinder having a control port via which fluid pressure is supplied and released concurrently with the application and release of said fluid pressure actuated brake mechanism;
  (b) a parking brake lever connected between said parking brake cylinder and a first one of said brake members;

(c) a piston operatively disposed in said parking brake cylinder and having a push rod projecting therefrom, said push rod having a connection with a second one of said first and second brake members, said piston cooperating with said parking brake cylinder to form therebetween a control chamber communicated with said control port, to which the supply of fluid pressure establishes relative axial movement between said piston and said parking brake cylinder in a first direction to accommodate movement of at least one of said first and second brake members in a brake release direction, said piston further cooperating with said parking brake cylinder to form therebetween a spring chamber on the opposite side of said piston as said control chamber;

(d) spring means normally disposed under tension in said spring chamber to urge relative axial movement between said piston and said parking brake cylinder in a direction opposite said first direction to cause concurrent movement of said at least one of said first and second brake members in a brake application direction in the absence of fluid pressure at said control chamber to establish a spring-applied parking brake force; and (e) said connection between said push rod and said second brake member comprising manually operable means for effecting axial displacement of said piston relative to said parking brake cylinder in said opposite direction an amount sufficient to cage said spring means and accordingly relieve said spring-applied parking brake force, wherein said manually operable means comprises:

(i) a bracket mounted on said second member and engageable with said piston push rod of said parking brake cylinder to provide said connection of said push rod with said second brake member; and (ii) cam means carried by said bracket for effecting said engagement of said bracket with said piston push rod in a first position, whereby relative axial movement therebetween is absent to accordingly maintain said spring means under tension, and for effecting said engagement between said bracket and said piston push rod with relative axial movement therebetween when said cam means is manually operated to a second position, thereby effecting said axial displacement of said piston relative to said parking brake cylinder to cage said spring means.

2. A parking brake device as recited in claim 1 wherein:

(a) said piston push rod is provided with an axially elongated slot terminating at one end in a cylindrical opening, the diameter of said opening being greater than the width of said slot; and (b) said cam means includes a disc segment rotatably disposed in said cylindrical opening so as to be aligned transverse of said slot in said first position of said cam means, and rotatable into longitudinal alignment with said slot in said second position of said cam means.

3. A parking brake device as recited in claim 2, further characterized in that said disc segment is sized to enter said elongated slot in said second position of said cam means to provide for said relative axial movement between said piston push rod and said bracket.

4. A parking brake device as recited in claim 2 or 3, further comprising second spring means for yieldingly urging rotation of said disc segment into transverse alignment with said slot.

5. A parking brake device as recited in claim 4, wherein:

(a) said bracket includes a mounting face bolted to said fluid pressure actuated brake mechanism and a pair of spaced-apart arms projecting from said mounting face, each said arm having a bore therein;

(b) said piston push rod having a flat end section arranged between said projecting arms of said mounting bracket and containing said cylindrical opening and said elongated slot;

(c) said cam means being a torsion bolt comprising:

(i) said disc segment disposed between said spaced-apart arms for operation in said cylindrical opening and said elongated slot of said piston push rod; and (ii) a shank projecting from each side of said disc segment and forming bearings operative in said bores of said arms; and (d) said second spring means being a torsion spring encircling one end of said shank, said torsion spring being connected at one end to said shank and at the other end to said bracket.

6. A parking brake device as recited in claim 1, 3, or 5, wherein said second brake member includes a brake cylinder of said fluid pressure actuated brake mechanism and said first brake member includes a piston push rod of said fluid pressure actuated brake mechanism, said piston push rod having an annular flange formed thereon and a sleeve member slidably disposed thereon, said parking brake lever being connected to said sleeve member so as to effect movement thereof into engagement with said flange and thereby effect said movement of said at least one of said first and second brake members in said brake application direction, in response to said relative axial movement between said piston and said parking brake cylinder in said opposite direction.

7. A parking brake device as recited in claim 3, further characterized in that said disc segment is semicircular in shape.

8. A parking brake device as recited in claim 7, further characterized in that the radius of said semicircular disc segment corresponds to the radius of said cylindrical opening.

9. A parking brake device as recited in claim 8, further characterized in that the width of said elongated slot is at least as great as the radius of said disc segment, one edge of said slot being tangent to said cylindrical opening.

10. A parking brake device as recited in claim 1, further comprising automatic reset means for resetting said cam means in said first position responsive to the supply of fluid pressure to said control port.

* * * * *